(No Model.)

G. MORTSON.
FLEXIBLE TIRED WHEEL.

No. 553,252. Patented Jan. 21, 1896.

Witnesses:
E. M. Taylor
M. Gibson.

Inventor:
George Mortson
By Redding & Kiddle
Attys.

UNITED STATES PATENT OFFICE.

GEORGE MORTSON, OF HARTFORD, CONNECTICUT, ASSIGNOR TO THE POPE MANUFACTURING COMPANY, OF SAME PLACE AND PORTLAND, MAINE.

FLEXIBLE-TIRED WHEEL.

SPECIFICATION forming part of Letters Patent No. 553,252, dated January 21, 1896.

Application filed February 23, 1894. Serial No. 501,156. (No model.)

*To all whom it may concern:*

Be it known that I, GEORGE MORTSON, a citizen of the United States, and a resident of Hartford, county of Hartford and State of Connecticut, have invented certain new and useful Improvements in Flexible-Tired Wheels, of which the following is a specification, reference being had to the accompanying drawings, forming part hereof.

This invention relates to flexible tires for wheels and to the rims and means for attaching the tires to the rims, and is especially adapted for use on bicycles and similar vehicles.

One of the objects of this invention is to provide for rapid attachment and removal of the tire for the purposes of repair or replacement.

Another object is to provide for rapid insertion or removal of the inner tube of a tire, having an outer sheath or cover and an inner inflatable tube.

Other objects are to provide a tire that will be firmly held in position, will not creep upon the rim, and will hold together when deflated, and may be used in an emergency when deflated, and will be of simple construction and strong and durable.

Figure 1:
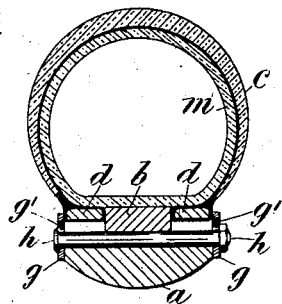
Figure 2:
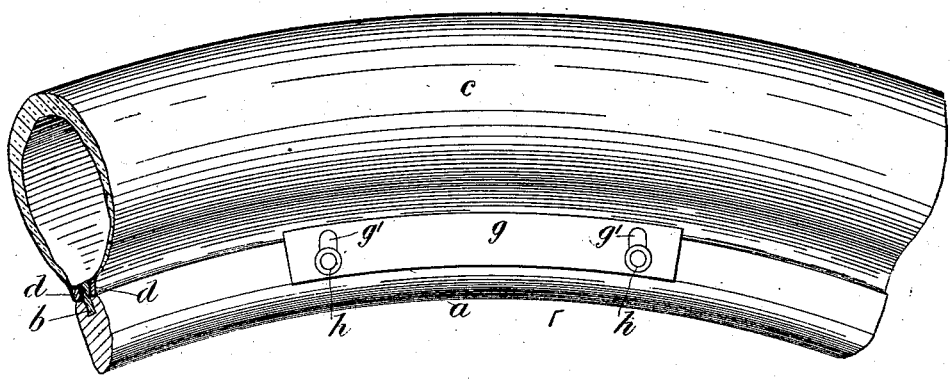
Figure 3:
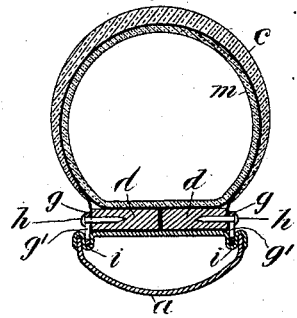

In the accompanying drawings, to which I will now refer, Figure 1 is a transverse section of a tire, rim, and retaining device embodying my invention, and Fig. 2 is a side elevation of a portion of the outer sheath and rim and shows one retaining device. Fig. 3 is a transverse section, and Fig. 4 a detail side elevation showing a modification.

In the embodiment of my invention shown in Figs. 1 and 2 of the drawings the rim $a$ is made of wood or similar material and is provided with a medial band or ridge $b$ seated within and extending out beyond the rim. This construction is highly satisfactory and the medial ridge performs a useful function; but the construction of the rim may be materially altered and a hollow metallic rim, as shown in Figs. 3 and 4, or of any suitable construction may be used, and in some constructions the medial band or ridge $b$ may not be used, such a construction being shown in Figs. 3 and 4, in which latter construction the bands or edges of the cover or sheath are of sufficient width to cover the outer periphery of the rim.

The tire, in the embodiment of my invention shown in the drawings, comprises an outer flexible sheath or cover $c$ and an inner inflatable tube $m$. The inner tube is of ordinary construction, and therefore need not be particularly described, and is shown only in Figs. 1 and 3. The flexible tire sheath or cover $c$ is provided with circumferentially-inextensible portions or edges mounted and supported upon the rim $a$. In the embodiment of my invention herein shown these circumferentially-inextensible portions comprise bands or hoops $d\ d$, which may be engaged with, inserted in, or secured to the edges of the sheath, and are shown as inserted and held within said edges. These bands $d\ d$ may be of any suitable material, or the edges of the sheath may be hardened or stiffened in any desired manner, but the bands or edges must be of such character, strength, or stiffness that they will not in use become materially stretched or extended in a circumferential direction around the rim. They are usually fitted quite tightly upon the outer periphery of the rim, as shown. They may be of various shapes in cross-section and are shown as thin bands in Figs. 1 and 2, such as would be employed when composed of metal, and as thick rectangular bands in Figs. 3 and 4, such as would be employed when composed of wood or similar light material.

The retaining device comprises clamping-plates carried by either the rim or the tire and fitted on such part so as to have a sliding movement, and so constructed and arranged that they can be moved over and engaged with the other part, to wit: the tire or the rim.

Figure 4:
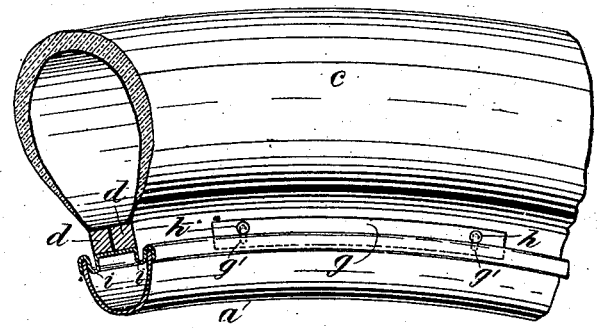

In the embodiment of my invention (shown in Figs. 1 and 2) the clamping-plates $g$ are carried by the rim and slide over and engage with the inextensible bands or edges $d$ of the flexible cover or sheath, while in the modified construction shown in Figs. 3 and 4 the clamping-plates $g$ are carried by the inextensible bands or edges $d$ of the cover or sheath and engage with a groove $i$ of the rim. In the embodiment of my invention shown these clamping-plates $g$ are provided with the slots $g'$ $g'$, and holding studs or bolts $h$ $h$, secured to or formed upon and projecting from the part carrying the clamping-plates $g$ enter these slots $g'$ $g'$ and by their heads hold the clamping-plates from lateral movement, while the shape of the slots permits the clamping-plates to slide over and engage with the other part—to wit, the tire in Figs. 1 and 2 and the rim in Figs. 3 and 4. By reason of the inextensible character of the bands or edges $d$ the only direction in which they can move off the rim is a lateral outward one, and the clamping-plates when in engaging position are rigid against lateral outward movement and thus firmly hold the tire to the rim, and this lateral outward pressure causes the clamping-plates to engage tightly with their holding devices or bolts, so that they are effectually prevented from sliding out of engaging position.

In the embodiment of my invention (shown in Figs. 1 and 2) the holding-bolts $h$ extend transversely from one side to the other of the rim, and are fitted in transverse slots in the rim and are held from radial outward movement by the medial band or ridge $b$. Each bolt or rod $h$ passes through a slot $g'$ of a clamping-plate on each side of the rim, and thus receives in opposite directions the lateral outward pressure of the bands or edges of the tire due to the pressure of air in the inner tube $m$, so that this pressure is sustained mainly by the bolts or rods $h$ and but very slightly by the rim.

In the modification shown in Figs. 3 and 4 the bolts $h$ are each secured within one of the inextensible bands or edges $d$ and each bolt enters the slot of but one clamping-plate $g$.

When it is desired to have access to or to remove the inner tube, the said tube is partially or wholly deflated. This relieves the pressure upon the retaining devices, so that they may be readily moved out of engaging position. One or both edges of the cover or sheath may then be moved off the rim. If they do not move off readily a slight inflation of the inner tube will push off one or both edges. It is of course evident that access may be had to the inner tube by the removal of but one edge of the cover or sheath, and that therefore one of said edges may be of any suitable character and may be held to the rim permanently or detachably in any desired manner, the other edge, however, to be circumferentially inextensible and to be engaged by my improved retaining device.

In the use of a tire having an inflatable tube it sometimes happens that the tube becomes deflated while the vehicle is on the road. In such emergency all the parts of my tire will hold together and maintain their positions without creeping, since they are held in place circumferentially, not only by the grip of the retaining devices, but also by the friction or grip of the inextensible bands or edges $d$ upon the rim, and this latter grip is not in any degree relieved by the deflation of the tire, while the construction of the tire permits the consequent flattening down without injury to any part of the tire.

The construction may be modified without departing from my invention by using in connection with my improved retaining device an arch or cushion tire or a single tube pneumatic tire or other constructions of inner inflatable tube and outer sheath tires, said tires, single tubes and outer sheaths having circumferentially inextensible portions supported upon the rim.

Various modifications may be made in the construction herein described, and shown in the drawings, and I do not therefore limit my invention to such specific constructions; but

What I claim is—

1. In a wheel the combination of a rim, a flexible tire having a circumferentially inextensible portion supported upon said rim, and one or more slotted clamping-plates, and holding studs entering said slots in the clamping plates and projecting from one of said parts, to wit, the tire or the rim, said plates being adapted to engage with the other of said parts to hold the tire from moving laterally off the rim and to be moved out of engagement with such other part to permit the separation of said parts, substantially as set forth.

2. In a wheel the combination of a rim and a flexible cover or sheath, one edge of said cover or sheath being of suitable character and suitably held to the rim and the other edge being circumferentially inextensible, and one or more slotted clamping plates, and holding studs entering said slots in the clamping plates and projecting from one of said parts, to wit, the inextensible edge or the rim, said plates being adapted to engage with the other of said parts to hold the said edge from moving laterally off the rim and to be moved out of engagement with such other part to permit the separation of said parts, substantially as set forth.

3. In a wheel the combination of a rim, a flexible cover or sheath and an inner inflatable tube, said cover or sheath having circumferentially inextensible edges, and one or more slotted clamping plates, and holding studs entering said slots in the clamping plates and projecting from one of said parts, to wit, the edges or the rim, said plates being adapted to engage with the other of said parts to hold the tire from moving laterally off the rim and to be moved out of engagement with such other parts to permit the separation of said parts, substantially as set forth.

4. In a wheel the combination of a rim, a flexible tire having a circumferentially inextensible portion supported upon said rim, and clamping plates mounted at both sides of said rim and held by and fitted to slide upon holding devices extending from one side to the other of the rim, said clamping plates being adapted to engage with the inextensible portion of the tire to hold the same from moving laterally off the rim, and to be moved out of engagement to permit the tire to be moved off the rim, substantially as set forth.

5. In a wheel the combination of a rim, a flexible cover or sheath and an inner inflatable tube, said cover or sheath having circumferentially inextensible edges supported upon said rim, and clamping plates mounted at both sides of said rim, and held by and fitted to slide upon holding devices extending from one side to the other of the rim, said clamping plates being adapted to engage with the inextensible edges to hold the same from moving laterally off the rim, and to be moved out of engagement to permit the said edges to be moved off the rim, substantially as set forth.

6. In a wheel the combination of a rim, a flexible tire having a circumferentially inextensible portion supported upon said rim, and slotted clamping plates mounted at both sides of said rim, and rods arranged transversely in said rim and entering said slots in the clamping plates at both sides of the rim, said clamping plates being held from lateral outward movement and being adapted to be moved into and out of engagement with the inextensible portion of the tire, substantially as set forth.

7. In a wheel the combination of a rim, a flexible cover or sheath and an inner inflatable tube, said cover or sheath having circumferentially inextensible edges supported upon said rim, and slotted clamping plates mounted at both sides of said rim, and rods arranged transversely in said rim and entering said slots in the clamping plates at both sides of the rim, said clamping plates being held from lateral outward movement and being adapted to be moved into and out of engagement with the said inextensible edges, substantially as set forth.

8. In a wheel the combination of a rim having a medial band or ridge, a flexible cover or sheath having circumferentially inextensible edges supported upon said rim on either side of said band or ridge, and an inner inflatable tube, and slotted clamping plates mounted at both sides of said rim, and rods mounted transversely in said rim and held from outward movement by said medial band or ridge and entering the slots in the said clamping plates at both sides of the rim, said clamping plates being held from lateral outward movement and being adapted to be moved into and out of engagement with the said inextensible edges, substantially as set forth.

9. In a wheel a rim for a flexible tire having its periphery adapted to support said tire and provided with one or more slotted clamping plates and holding studs entering said slots in the clamping plates and projecting from said rim, said plates being adapted to engage with said tire to hold the same from moving laterally off the rim without restricting its movement radially, substantially as set forth.

10. In a wheel a rim for a flexible tire having its periphery adapted to support said tire and provided with clamping plates mounted at both sides of said rim and held by and fitted to slide upon holding devices extending from one side to the other of the rim, said clamping plates being adapted to be moved into and out of engagement with the tire, substantially as set forth.

11. In a wheel a rim for a flexible tire having its periphery adapted to support said tire and provided with slotted clamping plates mounted at both sides of said rim and rods arranged transversely in said rim and entering said slots in the clamping plates at both sides of the rim, said clamping plates being held from lateral outward movement and being adapted to be moved into and out of engagement with the tire, substantially as set forth.

12. In a wheel a rim for a flexible tire having a medial band or ridge, in combination with slotted clamping plates mounted at both sides of said rim and rods mounted transversely in said rim and held from outward movement by said medial band or ridge and entering the slots in said clamping plates at both sides of said rim, said clamping plates being held from lateral outward movement and being adapted to be moved into and out of engagement with the tire, substantially as set forth.

This specification signed and witnessed this 19th day of February, 1894.

GEORGE MORTSON.

In presence of—
WILLIAM S. HAMILTON, Jr.,
A. M. CARLISLE.